Aug. 20, 1935.  R. M. NARDONE  2,012,087
ABRUPTLY RELEASABLE CLUTCH MECHANISM
Filed April 19, 1932   2 Sheets-Sheet 1

INVENTOR.
Romeo M. Nardone
BY
Warren T. Hunt
ATTORNEY.

Aug. 20, 1935.   R. M. NARDONE   2,012,087
ABRUPTLY RELEASABLE CLUTCH MECHANISM
Filed April 19, 1932   2 Sheets-Sheet 2
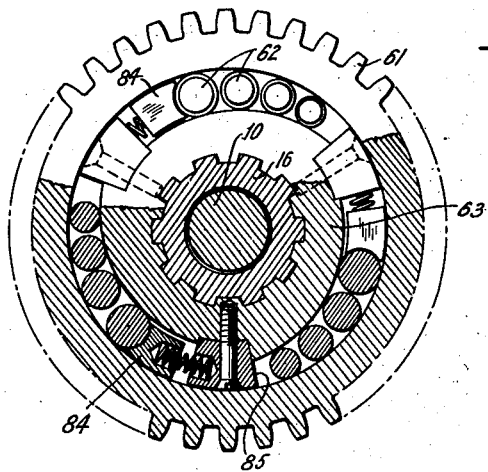
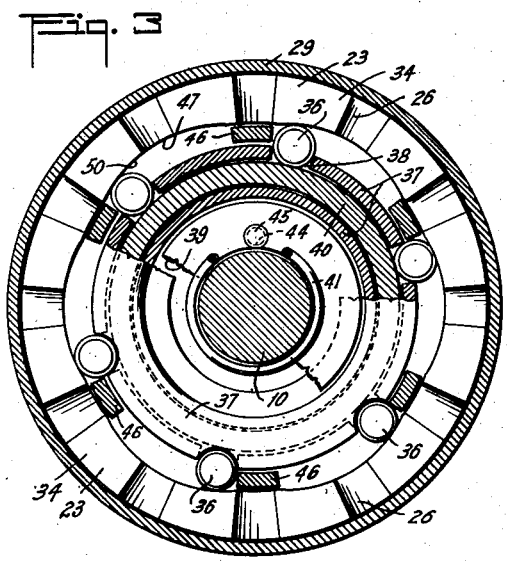
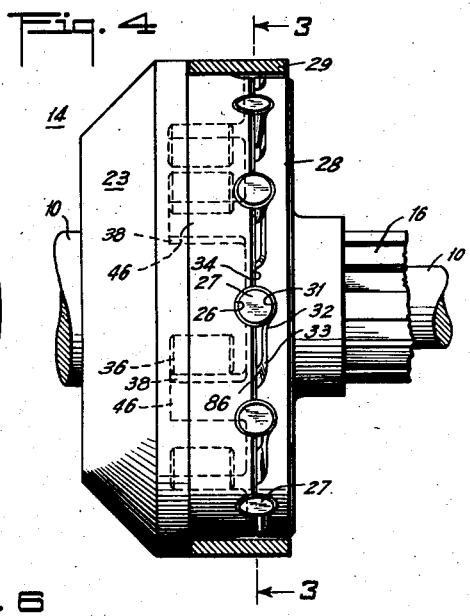
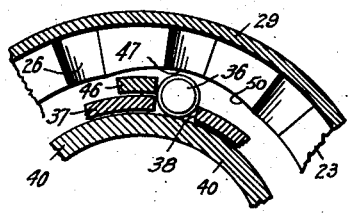
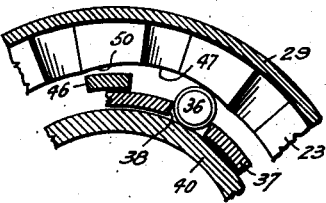
INVENTOR.
Romeo M. Nardone
BY Warren T. Hunt
ATTORNEY.

Patented Aug. 20, 1935

2,012,087

UNITED STATES PATENT OFFICE 2,012,087

ABRUPTLY RELEASABLE CLUTCH MECHANISM

Romeo M. Nardone, East Orange, N. J., assignor, by mesne assignments, to Eclipse Aviation Corporation, East Orange, N. J., a corporation of New Jersey Application April 19, 1932, Serial No. 606,245

17 Claims. (Cl. 192—48)

This invention relates to clutch mechanisms, and more particularly to clutches suitable for use in automatic variable speed transmission mechanisms.

An object of the invention is to provide an improved clutch mechanism which is abruptly releasable.

Another object of the invention is to provide an improved abruptly releasable clutch mechanism for an automatic variable speed transmission mechanism which is releasable at a predetermined load resistance.

Another object of the invention is to provide an improved absolutely releasable clutch mechanism which is engaged automatically upon a reversal of torque.

Another object of the invention is to provide an improved centrifugally controlled abruptly releasable clutch mechanism for connecting a driving shaft with a driven shaft.

In the illustrated embodiment, wherein the clutch mechanism is shown in connection with an automatic transmission, a pair of roller clutches is used, one of which includes cam surfaces which are in operative engagement in the high gear position but which are released abruptly when the driving force reaches a predetermined amount. The other clutch is preferably arranged in series with the cam clutch and is of the overrunning type arranged to be positively moved to the overrunning position when the cam clutch is released. A collar preferably is in frictional engagement with the driving shaft which is used to return the roller clutch to the driving position when the driving shaft tends to overrun the driven shaft. Centrifugal weights are also preferably used to increase the resistance to clutch release as the speed of the driven shaft increases.

Other objects and features of the invention will be apparent from the following description, in connection with which a preferred embodiment of the invention has been illustrated in the accompanying drawings, in which:

Fig. 2 is a sectional elevation through the overrunning clutch that is incorporated in the transmission second speed gear, the view being taken substantially along the line 2—2 of Fig. 1;

Fig. 3 is a sectional view of the improved abruptly releasable clutch taken along line 3—3 of Fig. 1 illustrating the position of the parts when in a normal driving position;

Fig. 4 is a side view partly in section of the clutch shown in Fig. 3;

Fig. 5 is a view similar to Fig. 3 showing the parts in the position occupied when the transmission is in the second speed position and the improved high speed clutch is released; and Fig. 6 is a view similar to Fig. 3 showing the position occupied by the parts when the driven shaft temporarily acts as the driving shaft.

Figure 1:
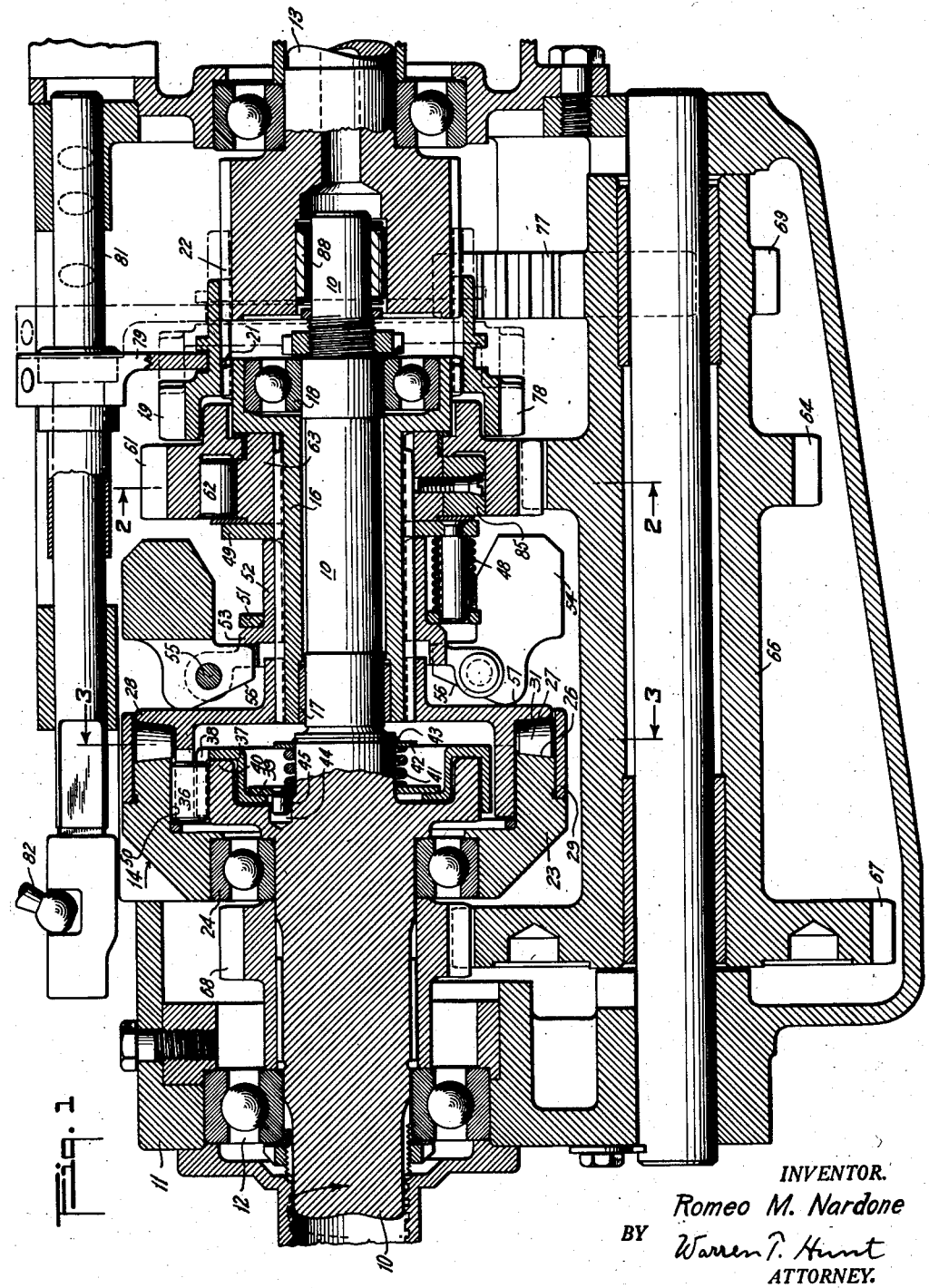
Fig. 1 is a sectional elevational view of the improved clutch embodied in a transmission.

In the drawings, 10 is the driving shaft mounted in the transmission casing 11 by bearing 12. Rotation of this shaft in the direction of the arrow shown in Fig. 1, (assuming that the parts are in the position shown), transmits the driving force to driven shaft 13 by means of an abruptly releasable clutch generally designated by 14 to the sleeve 16 rotatable upon driving shaft 10 by bearings 17 and 18, which sleeve, in turn, rotates gear 19 that is in engagement with teeth 21 and teeth 22 formed on the sleeve 16 and driven shaft 13 respectively. Clutch 14 includes an outer member 23 rotatable upon the driving shaft 10 by bearing 24 and provided with a plurality of grooves 26 in which are normally seated a plurality of tapered rollers 27 arranged in spaced relation about the member 23, the rollers being held in position by ring 29. A plate 28 is located adjacent the clutch member 23 and is provided with a series of grooves 31 which are provided with cam surfaces 32 inclined with respect to a plane perpendicular to the axis of shaft 10 and a continuation thereof 33 which is parallel to the corresponding face 34 of the member 23. A series of rollers 36 is interposed between member 23 and driving shaft 10, which are normally held in spaced relation about the driving shaft by a frictional member 37 having a slot 38 for each of the rollers, and normally rotatable with driving shaft 10 by reason of plate 39, which urges friction member 37 into contact with the enlarged portion 40 of shaft 10 by spring 41, the reaction force of the spring being taken by washer 42 held in position upon the driving shaft by lock ring 43. Plate 39 is preferably doweled to the driving shaft 10 by pin 45 having a sliding fit within a suitable opening 44.

Cam plate 28 is preferably provided with a series of fingers 46 which are adjacent the rollers 36 and adapted to force the latter in a clockwise direction from the driving position shown in Fig. 3 to the neutral position shown in Fig. 5, in which position the enlarged portion 47 of cam groove 50 is out of contact with roller 36 and there is no driving connection between the member 23 and the driving shaft 10. The cam plate 28 is normally urged toward the left, as viewed in Fig. 1, by a plurality of springs 48 (only one of which is shown) which coact between plate 49 and the sleeve 52 by means of disc 51. Centrifugal weights 54 are pivotally secured to sleeve 52 at 55 and are moved into contact with the cam plate 28, whereby the latter is urged toward the left and into driving engagement with member 23 by reason of the intermediate rollers 27.

Rotation of the sleeve 52 which is slidably splined to driven sleeve 16 urges the weights to an outer position, such as shown in Fig. 1, and wherein nose 57 of the weight contacts with the plate 28 which is also slidably splined to sleeve 16, and increases the driving force between plate 28 and member 23 as the speed of the driven shaft is increased. The second speed gear 61 includes an overrunning clutch having a plurality of rollers 62 which enable the race 63, keyed to the driven sleeve 16, to overrun gear 61 when sleeve 16 is turned in a clockwise direction, as viewed in Fig. 2, but to permit gear 61 to become the driving member when the speed of the driven sleeve 16 is the same as that of the gear. The second speed gear 61 is preferably in constant mesh with gear 64 constituting the second speed gear of countershaft 66, to which is secured gear 67 in constant mesh with gear 68 splined to the driving shaft 10, and reverse gear 69 in constant mesh with the reverse idler gear 77, which is adapted to engage teeth 78 of the coupling member 19, which may be moved to the rear for engagement with the idler gear by means of yoke 79 secured to rod 81 adapted to be moved by a manually operable lever 82.

In the operation of the clutch, when used in connection with an automotive vehicle transmission, driving shaft 10 will be rotated by the engine (not shown), and at low engine torque and low car speed, the flat faces 56 of the weights 54 will urge plate 28 into driving contact with the member 23, and the driven shaft 13, which is adapted to be connected to the driving wheels of a vehicle, will be rotated at engine speed. An increase of speed will cause weights 54 to move outwardly and compress the springs 48, this movement allowing the noses 57 of the weights to increase the pressure upon plate 28. A further increase in speed will cause weights 54 to assume their outermost position, preferably limited by shoulder 53, wherein sleeve 52 contacts with plate 49 and causes plate 28 to be pressed into engagement with the driving clutch member 23 at its maximum pressure. This operation in a transmission corresponds to the high gear position, during which sleeve 16 overruns the second speed gear 61 by reason of the interposed overrunning clutch, including the rollers 62 which are normally urged into driving engagement by spring pressed pressure members 84, coacting with members 85 integral with or otherwise fixed to member 63.

If the load on the driven shaft 13 should increase beyond the capacity of the clutch 14, as measured by the torque required to cause rollers 27 to rise over cam faces 32, the plate 28 will be moved toward the right against the action of weights 54 and allow said plate to lag behind the member 23, in which position rollers 27 will ride upon the parallel portion 33 of the plate, whereby there will be a free rolling contact, and plate 28 may lag behind the member 23 an amount equivalent to the length of the groove 86, as best seen in Fig. 4. Fingers 46, which are connected to plate 28, will also lag behind the member 23 and forcibly move rollers 36 to the enlarged portion 47 of the cam groove 58, whereby the rollers are moved out of frictional contact with the driving shaft 10. Immediately upon the movement of rollers 36 to the position shown in Fig. 5, the load will be assumed by the second speed gear 61, and the driven shaft 13 will be driven at a reduced speed through gears 68, 67, 64 and 61, it being understood that under these conditions the roller clutch of the second speed gear will drivably connect the gear with sleeve 16, and driving shaft 10 may rotate relatively to driven shaft 13 by reason of pilot bearing 88.

If the load on the driven shaft 13 should decrease to a point whereat the operator believes that the vehicle may be operated in high gear, the speed of the driving shaft 10 may be temporarily reduced by controlling the engine through the ordinary controls (not shown), and cause driven shaft 13 to temporarily act as a driving agent for shaft 10. Under these conditions, member 23 will overrun the driving shaft 10 and rollers 36 will assume the position shown in Fig. 6, whereby the engine of the vehicle may be used as a brake to retard the motion of the driven shaft 13.

The driving shaft 10 may again become a driving member by increasing the speed of the engine, whereby shaft 10 overruns the member 23 and the friction member 37 again carries the rollers to the position shown in Fig. 3 and the drive is resumed in the high speed gear, for it may be understood that plate 28 is always urged toward the left by springs 48 and centrifugal weights 54.

If for any reason it is desired to reverse the direction of vehicle movement, coupling member 19 is moved toward the right until teeth 78 mesh with the idler gear 77, whereupon the drive will be in the reverse direction through gears 68, 67, 69, idler gear 77, and coupler 19 which is splined to the driven shaft 13. Teeth 78 and teeth 21 of the member 19 are preferably formed of a width that will permit gear 78 to assume an intermediate position, as shown in the broken lines in Fig. 1, in which position the transmission is in neutral and no movement will be transmitted to shaft 13 by the driving shaft 10.

While a preferred embodiment of the invention has been illustrated and described, it is to be understood that this showing and description are illustrative only and that the invention is not regarded as limited to the form shown and described, except by the terms of the following claims.

What is claimed is:

1. In a device for connecting a driving shaft to a driven shaft, releasable means connecting the shafts comprising two roller clutches in series, one of which is abruptly releasable by load on the driven shaft, means connected to the driven shaft for positively releasing the other clutch, and means frictionally connected to the driving shaft for reengaging the last named clutch.

2. In a device for connecting a driving shaft to a driven shaft, releasable means connecting the shafts comprising two roller clutches in series, one of which is abruptly releasable by load on the driven shaft, means connected to the driven shaft for positively releasing the other clutch, means frictionally connected to the driving shaft for reengaging the last named clutch, and means responsive to driven shaft speed for increasing the releasing resistance of the first roller clutch.

3. In a clutch for connecting a driving shaft to a driven shaft, a driving member rotatably mounted on the driving shaft having axially extending cams having surfaces inclined with respect to a plane perpendicular to the shaft axis, a member secured to the driven shaft adjacent the driving member having cams with corresponding surfaces, rollers between said surfaces adapted to be wedged therebetween, one of said members having axial movement relative to the other, spring means urging the members together, said members having corresponding parallel surfaces adjacent the cam surfaces toward which said rollers are urged by reaction between the driving and driven members, said cam surfaces and spring means being formed and arranged whereby one of said members is moved axially at a predetermined load to release said rollers and permit the members to rotate relatively to a position wherein the rollers are positioned between the parallel surfaces, an overrunning device between the driving member and the driven shaft having a driving position and a released position, and means actuated by relative rotation of the members to move the device to the released position when the members have been rotated relatively by load reaction.

4. In a clutch for connecting a driving shaft to a driven shaft, a driving member rotatably mounted on the driving shaft having axially extending cams having surfaces inclined with respect to a plane perpendicular to the shaft axis, a member secured to the driven shaft adjacent the driving member having cams with corresponding surfaces, rollers between said surfaces adapted to be wedged therebetween, one of said members having axial movement relative to the other, spring means urging the members together, said members having corresponding parallel surfaces adjacent the cam surfaces toward which said rollers are urged by reaction between the driving and driven members, said cam surfaces and spring means being formed and arranged whereby one of said members is moved axially at a predetermined load to release said rollers and permit the members to rotate relatively to a position wherein the rollers are positioned between the parallel surfaces, an overrunning device between the driving member and the driven shaft having a driving position and a released position, means actuated by relative rotation of the members to move the device to the released position when the members have been rotated relatively by load reaction, and means frictionally connected with the driving shaft arranged to restore the device to the driving position when the relative rotative movement of the members is reversed and the rollers have reassumed a wedging position.

5. In a clutch for connecting a driving shaft to a driven shaft, a driving member rotatably mounted on the driving shaft having axially extending cams having surfaces inclined with respect to a plane perpendicular to the shaft axis, a member secured to the driven shaft adjacent the driving member having cams with corresponding surfaces, rollers between said surfaces adapted to be wedged therebetween, one of said members having axial movement relative to the other, spring means urging the members together, said members having corresponding parallel surfaces adjacent the cam surfaces toward which said rollers are urged by reaction between the driving and driven members, said cam surfaces and spring means being formed and arranged whereby one of said members is moved axially at a predetermined load to release said rollers and permit the members to rotate relatively to a position wherein the rollers are positioned between the parallel surfaces, an overrunning device between the driving member and the driven shaft having a driving position and a released position, means actuated by relative rotation of the members to move the device to the released position when the members have been rotated relatively by load reaction, means frictionally connected with the driving shaft arranged to restore the device to the driving position when the relative rotative movement of the members is reversed and the rollers have reassumed a wedging position, and centrifugal weights arranged to increase the force of the spring means as the speed of the driven shaft is increased.

6. In a clutch for connecting a driving shaft to a driven shaft, a driving member rotatably mounted on the driving shaft having axially extending cams having surfaces inclined with respect to a plane perpendicular to the shaft axis, a member secured to the driven shaft adjacent the driving member having cams with corresponding surfaces, rollers between said surfaces adapted to be wedged therebetween, one of said members having axial movement relative to the other, spring means urging the members together, said members having corresponding parallel surfaces adjacent the cam surfaces toward which said rollers are urged by reaction between the driving and driven members, said cam surfaces and spring means being formed and arranged whereby one of said members is moved axially at a predetermined load to release said rollers and permit the members to rotate relatively to a position wherein the rollers are positioned between the parallel surfaces, an overrunning device between the driving member and the driven shaft having a driving position and a released position, means actuated by relative rotation of the members to move the device to the released position when the members have been rotated relatively by load reaction, means frictionally connected with the driving shaft arranged to restore the device to the driving position when the relative rotative movement of the members is reversed and the rollers have reassumed a wedging position, a sleeve slidably connected to the driven shaft, and centrifugal weights pivoted to the sleeve and coacting between the spring means and the movable cam member, said weights being arranged to increase the spring pressure on the member as the driven shaft speed is increased.

7. In a device for connecting a driving shaft to a driven shaft, an abruptly releasable clutch arranged to release at a predetermined load reaction between the shafts, a roller clutch having a driving position and a nondriving position, said roller clutch and releasable clutch being arranged in series, means frictionally connected with the driving shaft and contacting the clutch rollers and means actuated by release of the first clutch arranged to overcome the resistance of the frictional means and move the roller clutch to the nondriving position.

8. In a device for connecting a driving shaft to a driven shaft, an abruptly releasable clutch arranged to release at a predetermined load reaction between the shafts, a roller clutch having a driving position and a nondriving position, said roller clutch and releasable clutch being arranged in series, means actuated by release of the first clutch arranged to move the roller clutch to the nondriving position, and means frictionally secured to the driving shaft for restoring the roller clutch to the driving position when the releasable clutch has reassumed its operative position.

9. In a clutch for connecting a driving shaft to a driven shaft, a member concentric with the driving shaft, an abruptly releasable device between the member and the driven shaft having coacting cams adapted to release at a predetermined driven shaft load, an overrunning device between the driving shaft and member having a forward driving, a reverse driving, and a free running position, means connected to the driven shaft cooperating with the overrunning device to move it to the free running position when the first named device is released, and means frictionally connected to the driving shaft for moving the overrunning device to the reverse driving position when the driven shaft overruns the driving shaft.

10. In a clutch for connecting a driving shaft to a driven shaft, a member concentric with the driving shaft, an abruptly releasable device between the member and the driven shaft having coacting cams with interposed rollers adapted to release at a predetermined driven shaft load, an overrunning device having rollers between the driving shaft and member having a driving and a free running position, means connected to the driven shaft cooperating with the overrunning device to move the rollers to the free running position when the first named device is released, said cams having coacting inclined surfaces for wedging the rollers in the driving position and coacting parallel surfaces between which the rollers are rotatable in the released position of the first named device, and means frictionally connected to one of said shafts for positioning said rollers by the relative movement of the driving and driven shafts.

11. In a clutch for connecting a driving shaft to a driven shaft, a member concentric with the driving shaft, an abruptly releasable device between the member and the driven shaft including coacting cams arranged to release at a predetermined driven shaft load, an overrunning device between the driving shaft and member having a driving and a free running position, means connected to the driven shaft cooperating with the overrunning device to move it to the free running position when the first named device is released, and means responsive to driven shaft speed for varying the load at which the first named device is released.

12. In a clutch for connecting a driving shaft to a driven shaft, a member concentric with the driving shaft, an abruptly releasable device between the member and the driven shaft including coacting cams arranged to release at a predetermined driven shaft load, an overrunning device between the driving shaft and member having a driving and a free running position, means connected to the driven shaft cooperating with the overrunning device to move it to the free running position when the first named device is released, means responsive to driven shaft speed for varying the load at which the first named device is released, and means frictionally engaging the driving shaft for restoring the overrunning device to the driving position.

13. In a clutch for connecting a driving shaft to a driven shaft, a member concentric with the driving shaft, an abruptly releasable device between the member and the driven shaft including coacting cams arranged to release at a predetermined driven shaft load, an overrunning device between the driving shaft and member having a driving and a free running position, means connected to the driven shaft cooperating with the overrunning device to move it to the free running position when the first named device is released, means responsive to driven shaft speed for varying the load at which the first named device is released, and means frictionally engaging the driving shaft for restoring the overrunning device to the driving position, said speed responsive means being arranged to increase the load as the speed of the driven shaft is increased.

14. In a device for connecting a driving shaft to a driven shaft, a pair of clutches arranged in series between the shafts, one of said clutches being abruptly releasable at a predetermined load, the other of said clutches having a driving and a free running position, means associated with the first clutch for moving the second clutch to a free running position when the first clutch is released, said abruptly releasable clutch being movable to an operative position upon a reversal of torque and means frictionally connected to the driving shaft for restoring the other clutch to driving position.

15. In a device for connecting a driving shaft to a driven shaft, a pair of clutches arranged in series between the shafts, one of said clutches being abruptly releasable at a predetermined load, the other of said clutches having a driving and a free running position, means associated with the first clutch for moving the second clutch to a free running position when the first clutch is released, means for restoring both clutches to driving positions, and centrifugal means for controlling the load at which the first clutch releases.

16. In a device for connecting a driving shaft to a driven shaft, an abruptly releasable clutch including a driving and a driven element, said clutch being free running when released, a second clutch having a driving and a non-driving position arranged between the driving shaft and the driving element of the first clutch, means connecting the driven element to the driven shaft, means actuated by a release of the first clutch for establishing the non-driving position of the second clutch, and means frictionally connected to one of said shafts and cooperative with the overrunning clutch for positioning the same in accordance with relative movement of the driving and driven shafts.

17. In a device for connecting a driving shaft to a driven shaft, an abruptly releasable clutch including a driving and a driven element, said clutch being free running when released, a second clutch having a driving and a non-driving position arranged between the driving shaft and the driving element of the first clutch, means connecting the driven element to the driven shaft, means actuated by a release of the first clutch for establishing the non-driving position of the second clutch, and means actuated by an overrunning of the driving element of the first clutch by the driving shaft for establishing the driving position of the second clutch.

ROMEO M. NARDONE.